US012241400B2

(12) United States Patent
Rodriguez et al.

(10) Patent No.: US 12,241,400 B2
(45) Date of Patent: Mar. 4, 2025

(54) WASTE HEAT RECOVERY SYSTEM

(71) Applicant: SIEMENS ENERGY GLOBAL GMBH & CO. KG, Munich (DE)

(72) Inventors: Jose L. Rodriguez, Longwood, FL (US); Ali Akturk, Oviedo, FL (US); Fuad Ismayilov, Orlando, FL (US); Ardit Bitincka, Orlando, FL (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/237,449

(22) Filed: Aug. 24, 2023

(65) Prior Publication Data

US 2024/0209766 A1    Jun. 27, 2024

Related U.S. Application Data

(60) Provisional application No. 63/434,157, filed on Dec. 21, 2022.

(51) Int. Cl.
*F01N 5/02* (2006.01)
*B60H 1/00* (2006.01)

(52) U.S. Cl.
CPC ........... *F01N 5/02* (2013.01); *B60H 1/00428* (2013.01); *F01N 2590/08* (2013.01)

(58) Field of Classification Search
CPC .......... F01N 5/025; F01N 5/02; F25D 11/003; F25D 29/003; F25B 27/02; F25B 13/00; F02G 5/02; B60H 1/3232
See application file for complete search history.

(56) References Cited

U.S. PATENT DOCUMENTS

| | | | |
|---|---|---|---|
| 11,407,283 B2* | 8/2022 | Andrews | B60H 1/00378 |
| 2011/0094224 A1* | 4/2011 | Sheidler | B60L 15/2045 |
| | | | 123/563 |
| 2011/0094486 A1* | 4/2011 | Vuk | F01N 5/04 |
| | | | 123/568.21 |
| 2015/0292784 A1* | 10/2015 | Yamanis | F25D 11/003 |
| | | | 417/376 |
| 2016/0053653 A1* | 2/2016 | Han | F28F 1/42 |
| | | | 165/154 |
| 2018/0050685 A1* | 2/2018 | Atluri | B60W 10/02 |
| 2019/0120530 A1* | 4/2019 | Chopko | F25B 31/02 |
| 2019/0128146 A1* | 5/2019 | Iwama | F01K 23/101 |
| 2019/0329629 A1* | 10/2019 | Andrews | B60H 1/20 |
| 2020/0141353 A1* | 5/2020 | Filippone | F02G 5/02 |
| 2023/0130504 A1* | 4/2023 | Voice | B01D 53/1493 |
| | | | 60/274 |
| 2024/0084731 A1* | 3/2024 | Retersdorf | F02C 6/08 |

FOREIGN PATENT DOCUMENTS

KR    2016088847 A  *  7/2016  ................ B63J 3/00

OTHER PUBLICATIONS

English Machine Translation Attached (Year: 2016).*

* cited by examiner

*Primary Examiner* — Anthony Ayala Delgado
(74) *Attorney, Agent, or Firm* — Wolter Van Dyke Davis, PLLC

(57) ABSTRACT

A waste heat recovery system 10 is provided to (i) capture waste heat 16, such as from or within an exhaust pipe 32 of a tractor-trailer 18, (ii) extract a thermal heat value from the waste heat 16, (iii) convert the thermal heat value into electricity, and (iv) route the electricity to an electricity sink 26, such as a tractor-trailer 18 Transport Refrigeration Unit (TRU).

20 Claims, 2 Drawing Sheets

WASTE HEAT RECOVERY SYSTEM

BACKGROUND

1. Field

The present invention relates in general to a waste heat recovery system 10, and more specifically to a tractor-trailer 18 waste heat recovery system 10 that captures waste heat 16 from an exhaust pipe 32 of a diesel engine 14 powered tractor-trailer 18 and converts that waste heat 16 into electricity that is routed to a Transport Refrigeration Unit (TRU) 26 on the tractor-trailer 18.

2. Description of the Related Art

Excess or waste heat from any of a variety of sources can be captured and used for operational improvement, system efficiency or other purposes. For example, it is known to capture waste heat from a gas turbine engine and utilize that waste heat as a heat source for a steam turbine, in a process known as combined cycle. For another example, US 2015/0292784 teaches capturing waste heat from a tractor-trailer transport refrigerant unit (TRU) and recycling the waste heat back into the TRU. However, each of these waste heat recovery systems or methods have various disadvantages, such as the need for additional components such as the steam turbine, technical complexity and high costs, which often render utilization of the waste heat to be less efficient than simply not utilizing the waste heat. What is therefore needed, is a waste heat recovery system that provides more benefits than the inputs required for implementation.

SUMMARY

In an aspect of the invention, a waste heat recovery system 10 is provided to (i) capture waste heat 16, such as from or within an exhaust pipe 32 of a tractor-trailer 18, (ii) extract a thermal heat value from the waste heat 16, (iii) convert the thermal heat value into electricity, and (iv) route the electricity to an electricity sink 26, such as a tractor-trailer 18 TRU.

In another aspect of the invention, a method of recovering waste heat 16 from a diesel engine 14 of a tractor-trailer 18 and converting the waste heat 16 into electricity used by a TRU 26 on the tractor-trailer 18, comprising capturing the waste heat 16 from an exhaust pipe 32 of the diesel engine 14 is provided; comprising extracting a thermal heat value from the captured waste heat 16 via a heat exchanger 38; and converting the extracted thermal heat value into generated electricity via a turbogenerator.

These and other features, aspects and advantages of the present invention will become better understood with reference to the following drawings, description and claims.

BRIEF DESCRIPTION OF THE DRAWINGS

The invention is shown in more detail by help of figures. The figures show preferred configurations and do not limit the scope of the invention.

DETAILED DESCRIPTION

In the following detailed description of the present invention, reference is made to the accompanying drawings that form a part hereof, and in which is shown by way of illustration, and not by way of limitation, specific embodiments by which the invention may be practiced. It is to be understood that other embodiments may be utilized and that changes may be made without departing from the spirit and scope of the subject matter or present invention.

Figure 1:
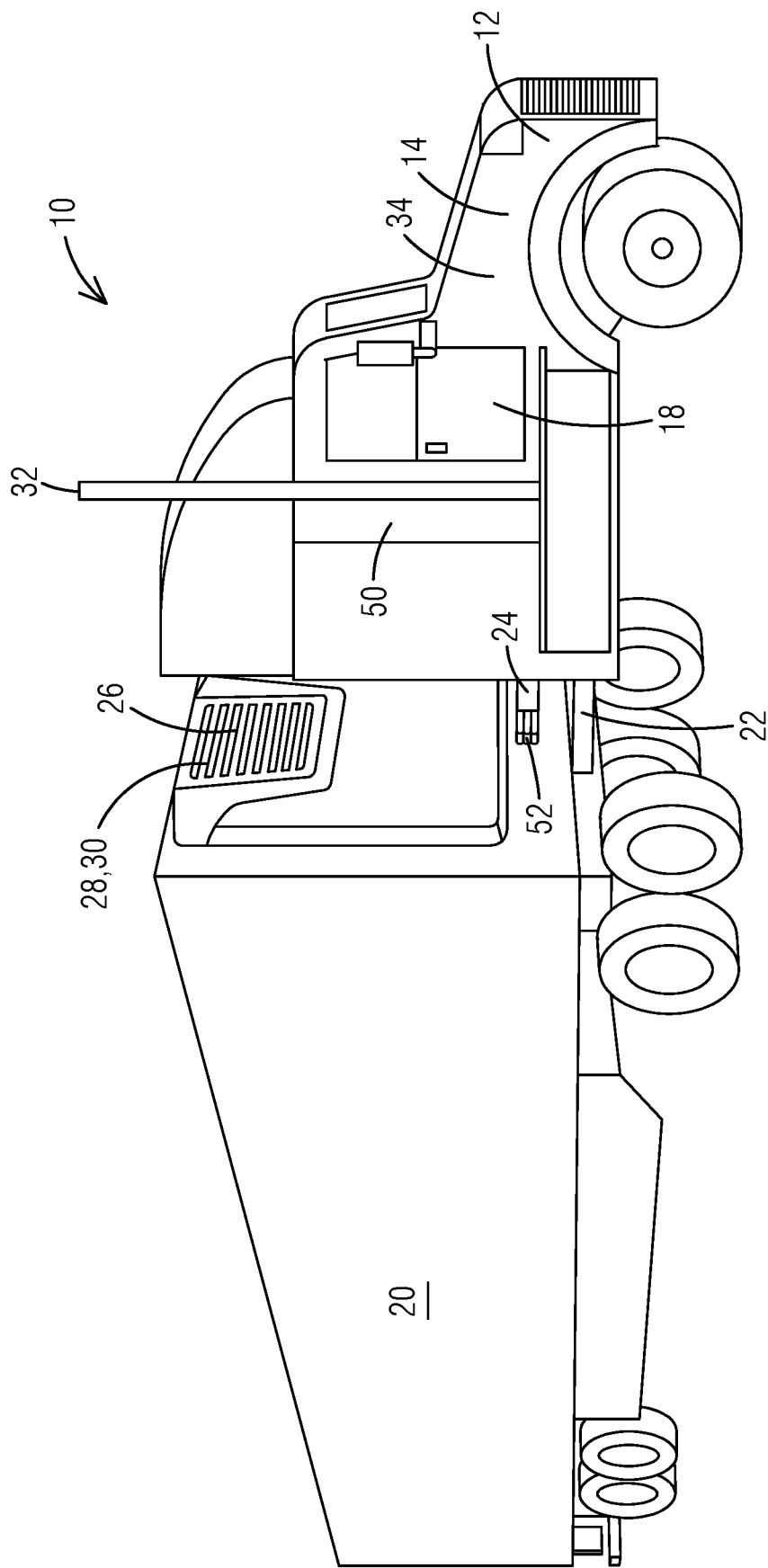
FIG. 1 is a perspective view of an exemplary tractor-trailer 18 waste heat recovery system 10 that captures waste heat 16 from an exhaust pipe 32 of a diesel engine 14 powered tractor-trailer 18 and converts that waste heat 16 into electricity that is routed to a TRU 26 on the tractor-trailer 18 in accordance with an exemplary embodiment of the subject matter.
Figure 2:
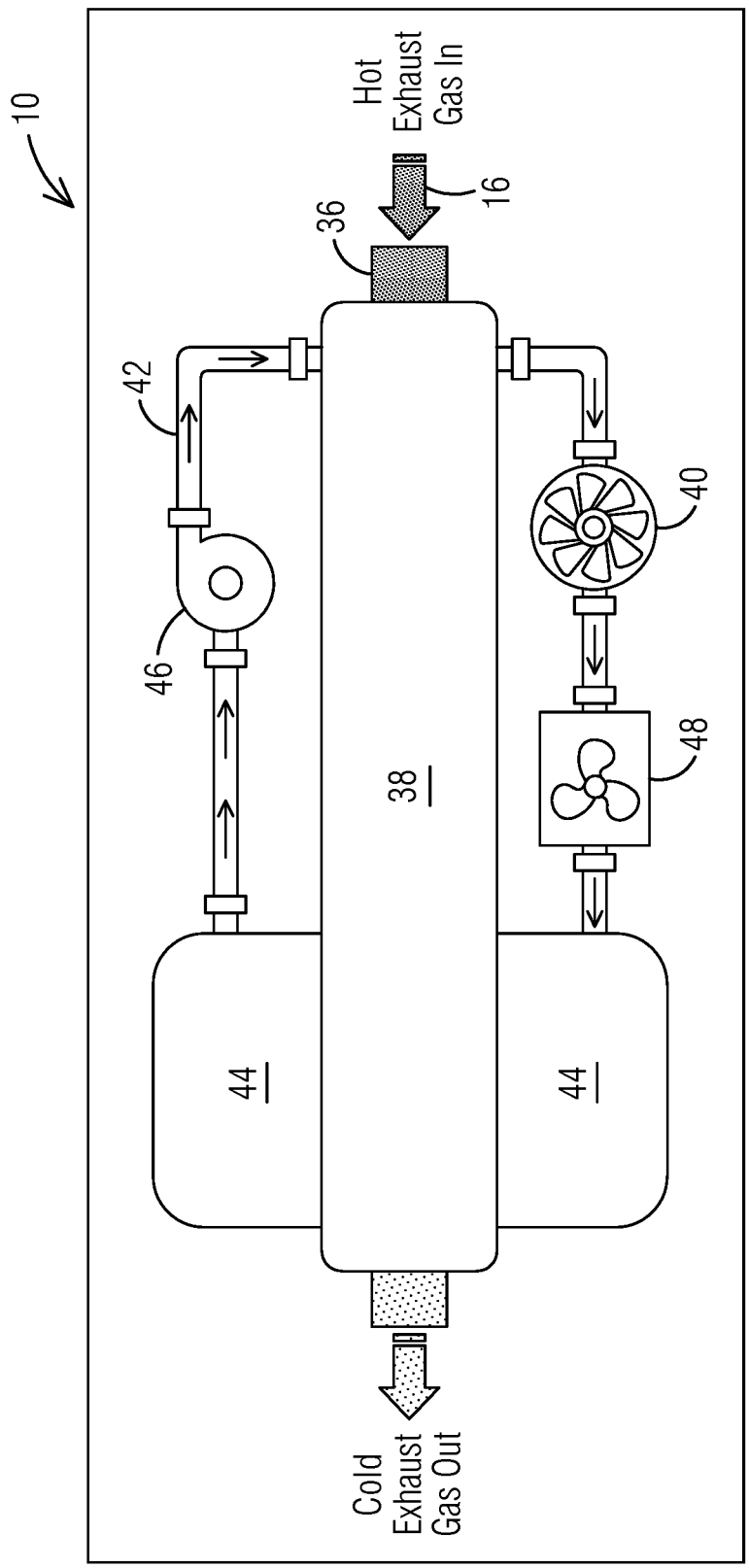
FIG. 2 is a schematic of an exemplary portion of a waste heat recovery configuration comprising a heat exchanger 38 and turbogenerator 40 to extract a thermal heat value from the waste heat 16 and convert thermal heat value into electricity in accordance with an exemplary embodiment of the subject matter.

As illustrated in FIGS. 1 and 2, a waste heat recovery system 10 is provided to (i) capture waste heat 16, such as from or within an exhaust pipe 32 of a tractor-trailer 18, (ii) extract a thermal heat value from the waste heat 16, (iii) convert the thermal heat value into electricity, and (iv) route the electricity to an electricity sink 26, such as a tractor-trailer 18 Transport Refrigeration Unit (TRU). While the waste heat recovery system 10 is illustrated in an exemplary context of use with a tractor-trailer 18, as will be understood by those skilled in the art, the waste heat recovery system 10 can be used in many other contexts of use, such as with other types of land vehicles, trains, aircraft, ships, buildings, equipment and the like which utilize a power source.

Referring now to FIG. 1, the exemplarily illustrated truck or tractor 12 may be any conventional, presently known or future trailer, such as a large semi-rig commonly used for long hauls or large cargos, or any conventional, presently known or future smaller truck, such as a 14'-21' cargo or transportation vehicle, van or other specialty vehicle such as a firetruck, ambulance and the like. The exemplary illustrated tractor 12 is powered by an internal power source 14, such as a diesel engine, gasoline engine, EV batteries or combinations thereof, whereby the power source 14 creates excess or waste heat 16. For illustrative purposes in context of the exemplary embodiment, a convention tractor-trailer 18 is shown having a tractor 12 powered by a diesel engine 14 and towing a trailer 20 operatively coupled to the tractor 12 via mechanical connections 22 and electrical connections 24. However, modifications thereto and alternative embodiments may also be utilized, as provided herein and as understood by those skilled in the art.

Still in context of the exemplary illustrated tractor-trailer 18, the trailer 20 may have one or more electricity sinks 26, such as a Transport Refrigeration Unit (TRU) 26 when the tractor-trailer 18 is used as a refrigerated transport system. However, the trailer 20 may have other electricity sinks or needs, such as heating, air conditioning, lighting, braking and combinations thereof. If used, a TRU 26 typically includes a small internal diesel engine 28 and a rechargeable battery 30 to power the TRU 26, however, the TRU 26 or other power sink(s) 26 need not include an internal diesel engine 28 or rechargeable battery 30 for purposes of the present waste heat recovery system 10.

In normal operation, the diesel engine 14 powers the tractor-trailer 18 and also creates excess or waste heat 16, typically in the range of 150° C.-500° C. as measured at or along at least one point or section of an exhaust pipe 32 of the diesel engine 14. A narrower range of 150° C.-275° C. as measured at an outlet 34 of the diesel engine 14 (which is upstream of the exhaust pipe 32) is preferred but not required for the illustrated system 10 in context of the exemplary embodiments for a more tuned overall system 10 performance as discussed below.

Referring now to FIG. 2, the portion of the illustrated waste heat recovery system 10 that (i) captures waste heat 16, such as from or within an exhaust pipe 32 of a tractor-trailer 18, (ii) extracts a thermal heat value from the waste heat 16, and (iii) converts the thermal heat value into electricity, is now shown and described. The general thermodynamic basis for this portion waste heat recovery system 10 can be accomplished in any of several ways, such as via an organic Rankine cycle, inverted Brayton cycle, Stirling cycle and the like. For present illustrated purposes of FIG. 2, an exemplary organic Rankine cycle is provided and described as herein inventively modified. The exemplary waste heat recovery system 10 comprises a waste heat inlet 36 (optional), a heat exchanger 38, a turbogenerator 40, and a refrigerant 42, and may include other optional components such as a pump 46 and a condenser 48. By way of the illustrated exemplary waste heat recovery system 10, waste heat 16 may be recovered and used for any of a variety of purposes, including without limitation conversion into electricity that is routed to an electricity sink 26 on a tractor-trailer 18 such as a TRU 26.

The optional waste heat inlet 36 is configured to receive excess or waste heat 16 from the diesel engine 14 (or from any one or more of a variety of other power sources 14, including without limitation, gasoline engine, EV batteries and the like). Depending on the amount or type of waste heat 16 required or desired, or a variety of other factors, the waste heat 16 may be selected or conditioned or tuned before, within or after the inlet 36, such as by a value, pressurization, filtration, heating, cooling, injection, condensation, humidification, concentration, dilution or other means. FIG. 2 exemplarily illustrates unconditioned waste heat 16 from the exhaust pipe 32 passively diverted directly into the waste heat inlet 36 via back pressure from the diesel engine 14. However, other suitable configurations can be used, such as by arranging a valve or using pressure to more precisely control the amount or type of waste heat 16 entering the inlet 36, or by integrating the entire exhaust pipe 32 waste heat 16 flow path into or as the inlet 36. Of course, no (in the case of integrating the entire exhaust pipe 32 waste heat 16 flow path into or as the inlet 36) or more than one inlet 36 can be used. If used, the inlet(s) 36 can be arranged at different location(s) near, on, along, or through the exhaust pipe 32 as well as other suitable locations.

The heat exchanger 38 is arranged in communication with the waste heat 16 and configured extract a thermal heat value from the waste heat 16 for use as a heat source for the turbogenerator 40. The heat exchanger 38 may be any conventional, presently known or future heat exchanger, such as those utilizing a tubular, coil, fin, or plate design in order to extract or otherwise draw or collect a thermal heat value from the waste heat 16. For illustrative purposes in context of the exemplary embodiment, a convention metallic tubular heat exchanger 38 may be arranged as a tubular pathway such that the waste heat 16 advances through a pathway defined by the tubes whereby a thermal heat value is extracted. However, depending on the amount or type of thermal heat value required or desired to be extracted from the waste heat 16 or a variety of other factors, other suitable heat exchangers 38 may be used including without limitation shell and tube heat exchangers, plate heat exchangers, plate and shell heat exchangers, adiabatic wheel heat exchangers, plate fin heat exchangers, finned tube heat exchangers, pillow plate heat exchangers, waste heat recovery unit heat exchangers, dynamic scaped surface heat exchangers, phase-change heat exchangers, direct contact heat exchangers and microchannel heat exchangers, as in as well those described www.en.wikipedia.org/wiki/Heat exchanger. Also, if desired, the heat exchanger 38 may optionally treat or condition or tune the waste heat 16, such as by pressurization, filtration, heating, cooling, injection, condensation, humidification, concentration, dilution or other means.

A turbogenerator 40 is arranged in communication with the heat exchanger 38 to receive the thermal heat value from the waste heat 16 and use the thermal heat value from the waste heat 16 as a power source in order to drive the turbogenerator 40 and generate electricity. The turbogenerator 40 may be any conventional, presently known or future turbogenerator, such those utilizing an expander and electric generator to work a pressurized hot working fluid, as discussed in more detail below. For illustrative purposes in context of the exemplary embodiment, a convention turbogenerator 40 is utilized to receive the thermal heat value and generate the electricity. However, depending on the amount or type of electricity required or desired to be generated from the waste heat 16 or a variety of other factors, other suitable turbogenerators 40 may be used. The illustrated exemplary turbogenerator 40 has a continuous power output capability of 2 kW-20 kW preferably 5 kW to 10 kW and receives a thermal heat value from a heat source of 150° C.-500° ° C. preferably 150° C.-275° C. However, the turbogenerator 40 may have power outputs greater or lesser than the illustrated embodiment and may receive heat source temperatures greater or lesser than the illustrated embodiment, depending on the particular desired electricity output, cycle and application.

A refrigerant 42 is advantageously used as a working fluid for the illustrated exemplary modified organic Rankine cycle. The refrigerant 42 may be stored in a plenum 44 that is in fluid communication with the heat exchanger 38 and turbogenerator 40. The plenum 44 can provide a source for refrigerant 42 storage, collection and embarkment, however, a plenum 44 need not be used for purposes of the modified organic Rankine cycle or waste heat recovery system 10. Any of a variety of refrigerants 42 may be used, including but not limited to R134a, R245fa, R123, R32, R143a and other refrigerants 42 approved for use with or commonly associated with tractor-trailers 18 or whichever context of use (e.g. other types of land vehicles, trains, aircraft, ships, buildings, equipment and the like) the waste heat recovery system 10 is used. Alternatively, other working fluids such as air, $CO_2$, water and the like may be used as or in lieu of a refrigerant 42 depending on the desired power output, efficiency, cost and application of the modified organic Rankine cycle or waste heat recovery system 10. It has been found that, in context of use with a conventional diesel tractor-trailer 18 having an exhaust pipe 32 waste heat 16 temperature of 150° C.-500° C., for system 10 efficiency it is desirous for the refrigerant 42 to have a boiling point within the range of 40° C.-200° ° C. when used with a modified organic Rankine cycle. However, the refrigerant 42 may have a boiling point or a latent heat that is greater or lesser than within those exemplary ranges, depending on the particular desired power output, efficiency, cost and application of the modified organic Rankine cycle or waste heat recovery system 10. However, if an inverted Brayton cycle or Stirling cycle is used, then the refrigerant 42 or working fluid need not be used at all and, for example, the waste heat 16 may be instead directly advanced into the heat exchanger 38 or turbogenerator 40.

Other components that are beneficial but not required for use with the modified organic Rankine cycle include but are not limited to a pump 46 and a condenser 48. If used, a pump 44 assists with refrigerant 42 flow, and a condenser 46 assists with condensing gaseous refrigerant 42 exiting the turbogenerator 36 into a liquid for more efficiency refrigerant 42 flow. The exemplary illustrated embodiment shows a pump 46 arranged between the plenum 44 and turbogenerator 40, although, if used, one or more pumps 46 could be arranged anywhere along the cycle or system 10. The exemplary illustrated embodiment also shows a condenser 48 arranged between the turbogenerator 40 and the plenum 44, although, if used, one or more condensers could be arranged anywhere along the cycle or system 10.

In operation, referring to FIG. 2, the illustrated exemplary embodiment shows a closed loop environment via a modified organic Rankine cycle, although an open loop environment could be used such as based on an inverted Brayton cycle or Stirling cycle. If the illustrated exemplary closed loop environment is used, the refrigerant 42 is used as a working fluid and optionally stored in the plenum 44 that is in fluid (i.e. liquid and/or gaseous) communication with the heat exchanger 38 and turbogenerator 40 as well as the optional pump 46 and condenser 48. In more detail, waste heat 16 from the exhaust pipe 32 enters through the waste heat inlet 36 and into the heat exchanger 38. As the waste heat 16 advances through the heat exchanger 38, a thermal heat value is extracted by the heat exchanger 38 to drive the turbogenerator 36, with the remaining relatively cooler waste heat 16 in the heat exchanger 38 advancing for thermal exchange with (closed loop environment) or into (open loop environment) the plenum 44 to temperature change, phase change, stabilize or otherwise act on or by the refrigerant 42 in the plenum 44. In this illustrated closed loop environment, the refrigerant 42 is pumped from the plenum 44 by the pump 46 through the closed loop environment, heated via the heat exchanger 38 by the waste heat 16 from the exhaust pipe 32, received by the turbogenerator 40 as thermal heat value in order to drive the turbogenerator 40 and generate electricity, condensed by the condenser 48, and then returned to the plenum 44 for fluid communication and heat exchange with relatively cooler refrigerant 42 already in the plenum 44. Also, any unused waste heat 16 from the waste heat inlet 36 and/or thermal heat value from the post-extraction heat exchanger 38 may be discharged or otherwise exited from the environment via a quasi-closed loop system 10.

Referring back to FIG. 1, the above-described exemplary environment may be configured within an enclosure or housing 50 to protect the environment from weather, physical damage and the like, as well as to protect people and objects from the heat and electricity of the environment. If used, the enclosure or housing 50 may be located near or on the exhaust pipe 32 to efficiently receive waste heat 16 from or within the exhaust pipe 32. Alternatively, the housing 50 may be integrated entirely or partially into the tractor 12, trailer 20 or tractor-trailer 18, or may be located entirely or partially within the exhaust pipe 32. Also, a plurality of housings 50 may be used, with the housings 50 housing one or more components of the environment or system 10.

Still referring to FIG. 1, the portion of the illustrated exemplary waste heat recovery system 10 that (iv) routes the generated electricity to an electricity sink 26, such as a tractor-trailer 18 TRU is now shown and provided. The electricity generated from the turbogenerator 40 is routed from the environment housing 50 to an electricity sink 26, such as the TRU located on the trailer 20 by one or more electrical cables 52. The routing may be done in any suitable manner, for example, the cable 52 may be routed together with and in the same manner as other cables or hoses routed between the tractor 12 and trailer 20 for overall cable management efficiency. Of course, if the electricity sink 26 is not located on the trailer 20 or if the housing 50 is not located on the tractor 12, then the cable 52 is routed accordingly. Also, suitable mechanisms other than electrical cables 52 may be used to route the electricity as will be understood by those skilled in the art.

Although the waste heat recovery system 10 illustrated above is shown as a modified organic Rankine cycle in a closed loop environment, as mentioned above, the general basis for this invention can be accomplished in other ways, such as based on an inverted Brayton cycle or Stirling cycle or in an open loop environment, such as where waste heat 16 is advanced (directly or indirectly) into the turbogenerator 40 without use of a heat exchanger 38 and/or refrigerant 42. If an inverted Brayton cycle or Stirling cycle is used, however, a refrigerant 42 still may be used as the working fluid for the turbogenerator 40, although air, waste heat 16 or another fluid also could be used as the working fluid.

Through the components, methods, cycles, environments and systems described herein, the waste heat recovery system 10 can generate electricity that can be used to power an electricity sink 26, such as a TRU 26. Depending on the available waste heat as well as the desired power output, efficiency, cost and application, the waste heat recovery system 10 can be configured to fully or partially power a TRU 26. If configured to partially power the TRU 26, the system 10 supplements the TRU's 26 internal diesel engine 28 and battery 30 that would otherwise solely power the TRU 26. In this partial power configuration, the cables 52 can be merged into or routed in parallel with electrical cables from or to the TRU 26, or alternatively the cables 52 can be merged or routed to the TRU battery 30 to provide a second battery 30 recharge source. If configured to fully power the TRU 26, the system 10 can wholly replace the TRU's internal diesel engine 28 and battery 30, with removal of the engine 28 and battery 30 reducing TRU 26 weight and thereby increasing tractor-trailer 18 fuel efficiency. Alternatively, only the internal diesel engine 28 can be removed with the internal battery 30 retained and recharged by electricity generated by the system 10 in order to power the TRU 26 while the tractor-trailer 18 is not in operation i.e. tractor 12 engine 14 not running. Of course, configurations and concepts from the partial and full power configurations can be mixed and matched.

While the waste heat recovery system 10 illustrated above is shown in an exemplary context of use with a tractor-trailer 18 powered by a diesel engine as the power source 14, the waste heat recovery system 10 also can be similarly used with a tractor-trailer 18 powered by an EV battery or electric drive system as the power source 14, with excess or waste heat 16, typically in the range of 75° C.-250° C. as measured at or along at least one point or section of an exhaust pipe 32 of the diesel engine 14, with a narrower range of 75° C.-175° C. as measured at an outlet 34 of the diesel engine 14 (which is upstream of the exhaust pipe 32) preferred but not required for the illustrated system 10 in context of the exemplary embodiments for a more tuned overall system 10 performance. If an EV battery or electric drive system is used as the power source 14, the excess heat 32 from the EV battery or electric drive system can be used as the waste heat 16 to drive the turbogenerator 40 and generate electricity. Depending on the available waste heat as well as the desired power output, efficiency, cost and application, an EV battery 14 powered waste heat recovery system 10 can be configured to fully or partially power the TRU 26. If configured to partially power the TRU 26, the system 10 supplements the TRU's 26 internal diesel engine 28 and battery 30 that would otherwise solely power the TRU 26. In this partial power configuration, the cables 52 can be merged into or routed in parallel with electrical cables from or into the TRU 26, or alternatively the cables 52 can be merged or routed to the TRU battery 30 to provide a second battery 30 recharge source, or further alternatively the cables can be routed directed from the EV battery 14 to the TRU 26. If configured to fully power the TRU 26, the system 10 can wholly replace the TRU's internal diesel engine 28 and TRU battery 30, with removal of the engine 28 and battery 30 reducing TRU 26 weight and thereby increasing tractor-trailer 18 fuel efficiency. Alternatively, only the internal diesel engine 28 can be removed with the internal battery 30 retained and recharged by electricity generated by the system 10 in order to power the TRU 26 while the tractor-trailer 18 is not in operation i.e. tractor 12 EV battery 14 not operating, or further alternatively electricity or cables can be routed directly from the EV battery to the TRU 26. Of course, configurations and concepts from the partial and full power configurations can be mixed and matched.

While specific exemplary embodiments and illustrations have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the subject matter, which is to be given the full breadth of the appended claims, and any and all equivalents thereof.

What is claimed is:

1. A tractor-trailer waste heat recovery system, comprising:
   a conduit configured to receive waste heat from a power source of a tractor-trailer and to establish a first flow path for the waste heat from the power source to the surrounding environment;
   a waste heat inlet that is configured to receive waste heat from the conduit and that is configured to establish a second flow path that branches off the first flow path for the waste heat received from the conduit;
   a heat exchanger that is in fluid communication with the waste heat inlet via the second flow path and that is adapted to extract a thermal heat value from the waste heat; and
   a turbogenerator in fluid communication with the heat exchanger, adapted to receive the thermal heat value from the waste heat and to convert the thermal heat value from the waste heat into generated electricity;
   wherein the first flow path is configured to direct waste heat that does not enter the waste heat inlet to the surrounding environment without passing through the heat exchanger.

2. The tractor-trailer waste heat recovery system of claim 1,
   wherein the power source comprises an engine,
   wherein exhaust from the engine comprises the waste heat; and
   wherein the waste heat inlet is configured to passively receive the exhaust from the engine.

3. The tractor-trailer waste heat recovery system of claim 2,
   wherein the conduit comprises an exhaust pipe that opens to the surrounding environment, and
   wherein the waste heat inlet is integrated into the exhaust pipe.

4. The tractor-trailer waste heat recovery system of claim 1, wherein the waste heat inlet comprises a valve that controls an amount of waste heat that enters the waste heat inlet.

5. The tractor-trailer waste heat recovery system of claim 1, wherein the waste heat inlet conditions the waste heat by a process selected from the group consisting of pressurization, filtration, injection, condensation, humidification, concentration, and dilution.

6. The tractor-trailer waste heat recovery system of claim 1, wherein the heat exchanger utilizes a metallic tube, coil, fin, or plate design to extract the thermal heat value from the waste heat.

7. The tractor-trailer waste heat recovery system of claim 1, wherein the turbogenerator receives the thermal heat value and uses the thermal heat value as a power source to drive the turbogenerator and generate electricity.

8. The tractor-trailer waste heat recovery system of claim 1, wherein the system has a power output of 2 kW-20 kW.

9. The tractor-trailer waste heat recovery system of claim 1, wherein the turbogenerator receives the thermal heat value from a heat source of 150° C.-500° C.

10. The tractor-trailer waste heat recovery system of claim 1, further comprising a refrigerant fluidly connecting the heat exchanger and the turbogenerator.

11. The tractor-trailer waste heat recovery system of claim 10, wherein the refrigerant is in a closed loop fluid environment, stored in a plenum, circulated by a pump into the turbogenerator, and condensed from a gaseous state to a liquid state by a condenser upstream of the turbogenerator.

12. The tractor-trailer waste heat recovery system of claim 1,
   wherein the conduit comprises an exhaust pipe comprising a vertical section configured to run vertically along and outside of a passenger cab of the tractor-trailer and to open to the surrounding environment at a terminal end of the conduit;
   the tractor-trailer waste heat recovery system further comprising a housing configured to be arranged adjacent the vertical section of the exhaust pipe, and to house the heat exchanger and the turbogenerator.

13. The tractor-trailer waste heat recovery system of claim 1, further comprising an electrical cable that routes the generated electricity from the turbogenerator to an electricity sink on the tractor-trailer.

14. The tractor-trailer waste heat recovery system claim 13, wherein the electricity sink is a transport refrigeration unit located on a trailer of the tractor-trailer.

15. The tractor-trailer waste heat recovery system of claim 14, wherein the transport refrigeration unit comprises an internal battery but does not comprise an internal diesel engine.

16. The tractor-trailer waste heat recovery system of claim 1, wherein the power source is selected from the group consisting of tractor diesel engine and tractor EV battery or electric drive system.

17. A method of recovering waste heat from a diesel engine of a tractor-trailer and converting the waste heat into electricity used by a transport refrigeration unit on the tractor-trailer, comprising:

exhausting waste heat from the diesel engine of the tractor-trailer via an exhaust pipe that establishes a first flow path that leads to the surrounding environment;

diverting a portion of an exhaust flow of the diesel engine from the exhaust pipe of the tractor-trailer via a second flow path that branches off the first flow path and that leads to a heat exchanger, wherein the exhaust flow in the second flow path comprises waste heat;

extracting a thermal heat value from the waste heat in the second flow path via the heat exchanger; and converting the extracted thermal heat value into generated electricity via a turbogenerator;

wherein the first flow path is configured to direct waste heat that does not enter the second flow path to the surrounding environment without passing through the heat exchanger.

18. The method of claim 17, further comprising a refrigerant fluidly connecting the heat exchanger and the turbogenerator in a closed loop environment, stored in a plenum, circulated by a pump into the turbogenerator, and condensed from a gaseous state to a liquid state by a condenser upstream of the turbogenerator.

19. The method of claim 18, further comprising routing the generated electricity to the transport refrigeration unit located on a trailer of the tractor-trailer via an electrical cable, and wherein the transport refrigeration unit comprises an internal battery and an internal diesel engine.

20. An apparatus, comprising:

a tractor comprising an engine, a passenger cab, and an exhaust pipe that is connected to the engine, that is configured to deliver engine exhaust from the engine to the surrounding environment, and that comprises a vertical portion adjacent the passenger cab;

an exhaust inlet that is disposed along the vertical portion of the exhaust pipe, that is configured to receive the engine exhaust from the exhaust pipe, and that is configured to establish a flow path that branches off of the exhaust pipe;

a heat exchanger connected to the exhaust inlet, configured to receive the engine exhaust via the flow path, and adapted to extract a thermal heat value from the engine exhaust; and a turbogenerator in fluid communication with the heat exchanger, adapted to receive the thermal heat value and to convert the thermal heat value into generated electricity;

wherein the exhaust pipe is configured to direct exhaust that does not enter the exhaust inlet to the surrounding environment without passing through the heat exchanger.

* * * * *